(12) United States Patent
Alanen

(10) Patent No.: US 7,986,725 B2
(45) Date of Patent: Jul. 26, 2011

(54) SPREAD SPECTRUM TRANSMISSION SYSTEMS

(75) Inventor: Kimmo Alanen, Lempäälä (FI)

(73) Assignee: Nokia Corporation, Espoo (FI)

( * ) Notice: Subject to any disclaimer, the term of this patent is extended or adjusted under 35 U.S.C. 154(b) by 1366 days.

(21) Appl. No.: 11/073,195

(22) Filed: Mar. 4, 2005

(65) Prior Publication Data

US 2006/0198428 A1 Sep. 7, 2006

(51) Int. Cl.
*H04B 1/38* (2006.01)
*G01S 19/39* (2010.01)

(52) U.S. Cl. .... 375/145; 375/146; 375/149; 342/357.22

(58) Field of Classification Search .................. 375/147, 375/E1.013, 134, 145, 316, 377, E1.005, 375/E1.016, 354–359, 343, 130–131, 135–137, 375/140–141, 149–150, 366–368; 342/357.01, 342/357.02, 357.05–357.06, 378, 357.08, 342/352, 357.09, 357.1, 357.12–357.16, 342/386; 340/539.13, 825.14, 539.1; 370/310, 370/342, 320, 335, 441; 701/207, 213, 214, 701/226; 455/3.02, 12.1, 13.2, 427
See application file for complete search history.

(56) References Cited

U.S. PATENT DOCUMENTS

| | | | | |
|---|---|---|---|---|
| 4,613,864 A * | 9/1986 | Hofgen | ..................... | 342/357.22 |
| 4,797,677 A * | 1/1989 | MacDoran et al. | ........... | 342/352 |
| 5,343,209 A * | 8/1994 | Sennott et al. | ........... | 342/357.29 |
| 5,535,278 A * | 7/1996 | Cahn et al. | ..................... | 380/274 |
| 5,764,686 A * | 6/1998 | Sanderford et al. | .......... | 375/149 |
| 6,121,923 A | 9/2000 | King | ........................ | 342/357.12 |
| 6,230,018 B1 * | 5/2001 | Watters et al. | ............. | 455/456.3 |
| 6,300,899 B1 * | 10/2001 | King | ........................ | 342/357.12 |
| 6,417,800 B1 * | 7/2002 | Valio et al. | ............... | 342/357.02 |
| 6,476,762 B2 * | 11/2002 | Valio et al. | ............... | 342/357.02 |
| 6,493,378 B1 * | 12/2002 | Zhodzishsky et al. | ........ | 375/149 |
| 6,618,006 B1 * | 9/2003 | Syrjarinne | ............... | 342/357.12 |
| RE38,523 E * | 6/2004 | Ozluturk | ....................... | 375/200 |
| 7,120,132 B2 * | 10/2006 | Choi et al. | ..................... | 370/324 |

(Continued)

FOREIGN PATENT DOCUMENTS

CN 1295383 A 5/2001

(Continued)

OTHER PUBLICATIONS

Daly et al., Navstar GPS and Glonass: Global Satellite Navigation Systems, 1993, vol. 5, pp. 349-357.*

(Continued)

*Primary Examiner* — Tesfaldet Bocure
*Assistant Examiner* — Lawrence B Williams
(74) *Attorney, Agent, or Firm* — Harrington & Smith

(57) ABSTRACT

A code phase signalling module arranged to provide code phase signalling to assist in signal acquisition of direct sequence spread spectrum signalling received by a receiver module from a transmitter module. The code phase signalling is arranged to be used by the receiver module to synchronise the phase of a synchronisation code provided from within the receiver module with the phase of a modulation code of the direct spread spectrum sequence signalling received by the receiver module. The synchronisation code sequence corresponds to the modulation code sequence. The code phase signalling module is arranged to provide code phase time signalling representing the offset time of the synchronisation code from a reference time. The reference time is associated with the time of transmission of a particular reference portion of the modulation code of the direct spread spectrum signalling.

33 Claims, 5 Drawing Sheets

U.S. PATENT DOCUMENTS

| | | | |
|---|---|---|---|
| 7,194,279 B2 * | 3/2007 | Mannerma | 455/500 |
| 7,352,834 B2 * | 4/2008 | Hakasalo et al. | 375/354 |
| 2002/0027949 A1 * | 3/2002 | Lennen | 375/147 |
| 2002/0123352 A1 | 9/2002 | Vayanos et al. | 455/456 |
| 2002/0138199 A1 * | 9/2002 | Brodie | 701/213 |
| 2004/0071200 A1 * | 4/2004 | Betz et al. | 375/152 |
| 2004/0078140 A1 | 4/2004 | Rowitch et al. | 701/213 |
| 2006/0022872 A1 * | 2/2006 | Zimmerman | 342/464 |
| 2008/0151971 A1 * | 6/2008 | Mo et al. | 375/150 |
| 2008/0309550 A1 * | 12/2008 | Sairo et al. | 342/357.1 |

FOREIGN PATENT DOCUMENTS

| | | |
|---|---|---|
| EP | 1057041 B1 | 12/2000 |
| WO | WO 00/10028 | 2/2000 |
| WO | WO 2005/109028 | 11/2005 |

OTHER PUBLICATIONS

3G TS 25.305 V2.0.0 (Dec. 1999).*

* cited by examiner

SPREAD SPECTRUM TRANSMISSION SYSTEMS

TECHNICAL FIELD OF THE INVENTION

The present invention relates to the field of Spread Spectrum Transmission Systems, specifically Direct Sequence Spread Spectrum transmission as employed in CDMA (code division multiple access) transmission systems. It is particularly relevant to satellite navigation systems, such as the GPS (Global Positioning System), the Glonass system (the Russian satellite navigation system) and the Galileo system (the European satellite navigation system currently under development) which employ CDMA transmission.

BACKGROUND TO THE INVENTION

There are three types of Spread Spectrum Transmission System. These are:
1. Frequency hopping—the signal is rapidly switched between different frequencies within the hopping bandwidth pseudo-randomly, and the receiver knows before hand where to find the signal at any given time.
2. Time hopping—the signal is transmitted in short bursts pseudo-randomly, and the receiver knows beforehand when to expect the burst.
3. Direct sequence—the digital data is directly coded at a much higher frequency. The code is generated pseudo-randomly, the receiver knows how to generate the same code, and correlates the received signal with that code to extract the data.

In general, such Spread Spectrum transmission systems are distinguished by three key elements:
i) The signal occupies a bandwidth much greater than that which is necessary to send the information. This results in many benefits, such as immunity to interference and jamming and multi-user access.
ii) The bandwidth is spread by means of a code which is independent of the data. The independence of the code distinguishes this from standard modulation schemes in which the data modulation will always spread the spectrum somewhat.
iii) The receiver synchronizes to the code to recover the data. The use of an independent code and synchronous reception allows multiple users to access the same frequency band at the same time.

In order to protect the signal, the code used is pseudo-random. It appears random, but is actually deterministic, so that the receiver can reconstruct the code for synchronous detection. This pseudo-random code is also called pseudo-noise (PN).

The present invention is particularly relevant to CDMA transmission, which is a form of Direct Sequence Spread Spectrum transmission. CDMA can be used for the transmission of digitized voice, ISDN channels, modem data, etc. Such transmission is shown in FIG. 1, which shows a simplified Direct Sequence Spread Spectrum CDMA system. For clarity, the figure shows one channel operating in one direction only. FIG. 2 illustrates how information data modulates the pseudorandom code. The general operating principles of such a CDMA system are well known and will not be considered in detail here. However, it can be considered to comprise the following in which:

A) Signal transmission consists of the following steps (FIG. 1, FIG. 2):
  1. A pseudo-random code is generated, different for each channel and each successive connection.
  2. The Information "signal" data modulates the pseudo-random code (the Information data is "spread", FIG. 2).
  3. The resulting signal modulates a carrier.
  4. The modulated carrier is amplified and broadcast.

B) Signal reception consists of the following steps (FIG. 1):
  1. The carrier is received and amplified.
  2. The received signal is mixed with a local carrier to recover the spread digital signal.
  3. A pseudo-random code is generated, matching the anticipated signal.
  4. The receiver acquires the received code and phase locks its own code to it.
  5. The received signal is correlated with the generated code, extracting the Information data.

Satellite navigation systems, such as GPS and Galileo, use a CDMA transmission system. For simplicity, the foregoing text will focus on satellite navigation systems, taking the GPS system as a specific example.

The GPS system presently comprises more than 24 satellites, of which usually from 8 to 16 are simultaneously within the sight of a receiver. These satellites transmit e.g. orbital parameters, time information of the transmission, etc. A receiver, used in positioning, normally deduces its position by calculating the propagation time of a signal transmitted simultaneously from several satellites, belonging to the positioning system, to the receiver. For the positioning, the receiver must typically receive the signal of at least four satellites within sight to compute the position.

Each satellite of the GPS system transmits a "ranging" signal at a carrier frequency of 1575.42 MHz called L1. This frequency is also indicated with 154f0, where f0=10.23 MHz. Furthermore, the satellites transmit another "ranging" signal at a carrier frequency of 1227.6 MHz called L2, i.e. 120f0. However, this L2 signal is not in civilian use and will not be described in detail here.

In the satellite, the modulation of these signals is performed with at least one pseudo random sequence. This pseudo random sequence is different for each satellite and each "ranging" signal from each satellite. As a result of the modulation, a code-modulated wideband "ranging" signal is generated. The modulation technique used makes it possible in the receiver to distinguish between the signals transmitted from different satellites, although the carrier frequencies used in the transmission are substantially the same (i.e. CDMA).

In each satellite, for modulating the L1 signal, the pseudo random sequence used is e.g. a so-called C/A code (Coarse/Acquisition code), which is a code from the family of the Gold codes. Each GPS satellite transmits a signal by using an individual (unique) C/A code. The codes are formed as a modulo-2 sum of two 1023-bit binary sequences. The first binary sequence G1 is formed with a polynome $X<10>+X<3>+1$, and the second binary sequence G2 is formed by delaying the polynome $X<10>+X<9>+X<8>+X<6>+X<3>+X<2>+1$ in such a way that the delay is different for each satellite. This arrangement makes it possible to produce different C/A codes with an identical code generator. The C/A codes are thus binary codes whose chipping rate in the GPS system is 1.023 MHz.

The C/A code comprises 1023 chips, wherein the iteration time (epoch) of the code is 1 ms. The carrier of the L1 signal is further modulated by navigation information at a bit rate of 50 bit/s. The navigation information comprises information about the satellite integrity ("health"), orbital parameters, GPS time information, etc.

The satellites are each arranged to transmit the beginning of their C/A code at the same instant in time, e.g. the start of the week. Once the C/A code from each satellite has been transmitted, the C/A code is repeated.

During their operation, the satellites monitor the condition of their equipment. The satellites may use, for example, so-called "watch-dog" operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. Furthermore, in a situation in which the signal of more than four satellites can be received, the information received from different satellites can be weighted differently on the basis of, for instance, carrier to noise ratio. Thus, it is possible to minimize the effect of errors on measurements, possibly caused by satellites which have a low signal level.

To detect the signals of the satellites and to identify the satellites, the receiver must perform acquisition, whereby the receiver searches for the signal of each satellite at a time and attempts to be synchronized and locked to this signal so that the pseudorange measurement (distance to a satellite) can be made. If the signal level is very low, and the signal cannot be demodulated it is still possible to make a pseudorange measurement, and calculate the receiver position with it if the ephemeris information is available Acquisition of a GPS signal occurs by sequentially adjusting the relative timing, which is defined as code phase, of the stored replica (synchronisation) code sequence in the GPS receiver relative to the received signal broadcast by the satellite, and observing the correlation output. The alignment of the code phase must be within less than one chip of the sequence for any measurable response. This might mean searching for a response by trying up to all 1,023 possible code phase positions. However, network assistance may speed up this process (see below).

The positioning receiver must perform the acquisition e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming in the receiver. Also, in urban areas, buildings affect the signal to be received, and furthermore, so-called multipath propagation can occur, wherein the transmitted signal comes into the receiver along different paths, e.g. directly from the satellite (line-of-sight) and also reflected from buildings. This multipath propagation causes that the same signal is received as several signals with different phases.

Following signal acquisition (and Doppler frequency adjustment to take account of the relative movement between the satellites and the receiver—not discussed here), the positioning arrangement in the receiver has two primary functions:

1. To calculate the pseudorange between the receiver and the different GPS satellites, and
2. To determine the position of the receiver by utilizing the calculated pseudoranges and the position data of the satellites. The position data of the satellites at each time can be calculated on the basis of the Ephemeris received from the satellites.

The distances to the satellites are called pseudoranges, because the time is not accurately known in the receiver. Thus, the determinations of position and time are repeated until a sufficient accuracy is achieved with respect to time and position. Because time is not known with absolute precision, the position and the time must be determined e.g. by linearizing a set of equations for each new iteration. The pseudorange can be calculated by measuring the pseudo transmission time delays between signals of different satellites.

Almost all known GPS receivers utilize correlation methods for acquisition to the code as well as for tracking. In a positioning receiver, reference synchronisation codes ref(k), i.e. the pseudorandom sequences for different satellites are stored or generated locally. A received signal is subjected to conversion to an intermediate frequency (down conversion), after which the receiver multiplies the received signal with the stored pseudo random sequence. The signal obtained as a result of the multiplication is integrated or low-pass filtered, wherein the result is data about whether the received signal contained a signal transmitted by a particular satellite.

The multiplication is iterated in the receiver so that each time, the phase of the (synchronisation) pseudorandom sequence stored in the receiver is shifted. The correct phase is inferred from the correlation result, preferably so that when the correlation result is the greatest, the correct phase has been found. Thus, the receiver is correctly synchronized with the received signal. After the code acquisition has been completed, the next steps are frequency tuning and phase locking.

The above-mentioned acquisition and frequency control process must be performed for each signal of a satellite received in the receiver. Some receivers may have several receiving channels, wherein an attempt is made on each receiving channel to be synchronized with the signal of one satellite at a time and to find out the information transmitted by this satellite.

The positioning receiver receives information transmitted by satellites and performs positioning on the basis of the received information. For the positioning, the receiver must receive the signal transmitted by at least four different satellites to find out the x, y, z coordinates and the time data. The received navigation information is stored in a memory, wherein this stored information can be used to find out e.g. the Ephemeris data of satellites.

As previously mentioned, networks (for example cellular networks which can employ GSM, PDC, CDMA, WCDMA, CDMA2000 etc. transmission technology) are known to assist receivers in acquiring the signalling from one or more satellites to speed up the acquisition process. Thus, rather than starting the synchronisation process at an arbitrary bit position in the (synchronisation) pseudorandom code sequence, the starting point for synchronization, between the received signal and the stored/generated (synchronisation) pseudorandom code sequence is based on information provided by the network.

Currently, networks assist the positioning receivers in the code phase search by providing the position within a (synchronisation) generated/stored code to be used as a starting position in the correlation process with reference to sequence length. Thus, for example, the network provides that the starting position in the synchronisation code should be at a position corresponding to position 659 from the start of a code sequence.

The starting point is only valid at a certain time, and this validity time is also provided with the network assistance transmission. Also, the network must somehow provide (or trust that the receiver already has) knowledge of time into the receiver. However, such time transfer methods are not themselves the focus of the present invention, although they could be used in conduction with the present invention. After having the knowledge of the code phase starting point at some point in time and knowledge of the current time, the receiver can calculate the code phase starting point for the current time.

An uncertainty tolerance window is also provided. This is also provided in relation to sequence length. Thus, the starting position may be position 659+/−8 chip lengths in the code sequence. The uncertainty tolerance window is relevant to the elevation angle of the satellite. This is due to the fact that usually from the acquisition assistance provider's perspective the uncertainty of the remote receiver's location is greater than the uncertainty of the altitude. Therefore, the uncertainty window for the acquisition assistance is greater for those satellites, which are low on horizon.

The GPS system uses a pseudorandom code of a fixed length (1023 chips) i.e. each satellite transmitter modulates its signal by a unique pseudorandom code of the same length. The Galileo system may use a variable length pseudorandom code or it may use a static length code, but the actual length of the code may be different from GPS.

SUMMARY OF THE PRESENT INVENTION

In a first aspect, the present invention provides a code phase signalling module arranged to provide code phase signalling to assist in signal acquisition of direct sequence spread spectrum signalling received by a receiver module from a transmitter module, wherein the code phase signalling is arranged to be used by the receiver module to synchronise the phase of a synchronisation code provided from within the receiver module with the phase of a modulation code of the direct spread spectrum sequence signalling received by the receiver module, the synchronisation code sequence corresponding to the modulation code sequence, wherein the code phase signalling module is arranged to provide code phase time signalling representing the offset time of the synchronisation code from a reference time, wherein the reference time is associated with the time of transmission of a particular reference portion of the modulation code of the direct spread spectrum signalling, and wherein the offset time is associated with the time of transmission of a subsequently transmitted offset portion of the modulation code of the direct spread spectrum sequence signalling.

The code phase signalling provided by the device is independent of the code length. It is directly based on time and therefore can work regardless of the length of the code.

The module may be arranged to provide code phase signalling in one or more multi code length direct sequence spread spectrum systems.

The code phase may be used to synchronise with a past, present, or future received portion of the code sequence received from the transmitter module.

The offset time may be used to synchronise with a past, present, or future received portion of the code sequence received from transmitter module.

The modulation code sequence may have a length comprising a predetermined number of chips, and the module may be arranged to represent the offset time of the modulation code by dividing the number of chips from the offset position to the reference position by the predetermined number of chips corresponding to the sequence length.

The modulation code sequence may have a length comprising a predetermined number of chips transmitted at a particular transmission rate, and the module may be arranged to represent the offset time of the modulation code by dividing the number of from the offset position to the reference position by the transmission rate of the predetermined number of chips corresponding to the sequence length.

The transmitter module may be inside the same device as the receiver module. The transmitter module may be a PE and the receiver module may be a ME.

The modulation code may be arranged to cyclically repeat.

The reference time may represent the beginning of a cyclically repeating modulation code.

The reference portion may be the beginning, middle or end of the code.

The synchronisation code sequence may be a pseudorandom code sequence.

The synchronisation code sequence may be provided from within the receiver module by a shift register or a memory.

The direct sequence spread spectrum may be code division multiple access signalling.

The module may be comprised in a cellular network device.

The module may be comprised in a receiver comprising the receiver module.

The module may be comprised in a receiver comprising the receiver module, and the receiver may be a cellular telecommunications device.

The receiver module may be comprised in a global navigation satellite receiver.

The receiver module may be a receiver module remote of the module.

The transmitter module may be a transmitter module remote of the module.

The present invention also provides a cellular network device comprising a module.

The module may be arranged to transmit the code phase signalling via a cellular air interface to a receiver module comprised in a cellular telecommunications device.

In a second aspect, the present invention provides a receiver module arranged to receive code phase signalling assistance, from a code phase signalling module, to assist in signal acquisition of direct sequence spread spectrum signalling received by the receiver module from a transmitter module, wherein the code phase signalling is arranged to be used by the receiver module to synchronise the phase of a synchronisation code provided from within the receiver module with the phase of a modulation code of the direct spread spectrum sequence signalling received by the receiver module, the synchronisation code sequence corresponding to the modulation code sequence, wherein the receiver module is arranged to receive code phase signalling representing the offset time of the synchronisation code from a reference time, wherein the reference time is associated with the time of transmission of a particular reference portion of the modulation code of the direct spread spectrum signalling, and wherein the offset time is associated with the time of transmission of a subsequently transmitted offset portion of the modulation code of the direct spread spectrum sequence signalling.

The present invention also comprises computer code arranged to provide code phase signalling assistance and computer code arranged to receive code phase signalling assistance.

The present invention also encompasses a system comprising a module according to the first aspect of the invention and a receiver module according to second aspect of the invention.

The present invention also encompasses a global navigation satellite system comprising a module according to the first aspect of the invention and a receiver module according to second aspect of the invention.

The present invention encompasses one or more aspects and or embodiments in appropriately modified one or more combinations. Thus, features specifically recited for one aspect or embodiment of the invention may also be provided in another aspect or embodiment of the invention, with appropriate amendments made, even though the specific combination may not be specifically recited. One or more features of the described prior art may be added to one or more aspects or embodiments of the present invention.

BRIEF DESCRIPTION OF THE FIGURES

Specific embodiments of the present invention will now be described with reference to the following Figures in which.

DETAILED DESCRIPTION OF SPECIFIC EMBODIMENTS

Consider a number of satellite navigation transmitters 1, 2, 3, 4 etc, each continuously modulating their signalling for transmission by a corresponding unique pseudorandom code sequence, P1, P2, P3, P4 . . . etc to provide CDMA signalling. Each satellite is arranged to commence transmission of its signalling from a reference time, say Monday 12.00 am GMT. The commencement of signalling is associated with the beginning of the modulation sequence. Thus, 12.00 am GMT is associated with the beginning of each of the code sequences P1, P2, P3 and P4. Satellites 1 and 4 are associated with GPS GNSS and satellites 2 and 3 are associated with the Galileo GNSS. In the present example, the beginning of the modulation sequence for the two systems is the same, i.e. Monday 12 am GMT. However, the beginning of the modulation sequence of the two systems could start at different times.

Some of the codes have a different sequence length to others. So, for example, P1 is 1023 chips long, P2 is 4095 (larger than P1) chips long, P3 is 511 (smaller than P1) chips long and P4 is 1023 chips long. Each satellite continues with the modulation from the start of the sequence once it has come to the end of the sequence. In the case of P1 and P4, this is after every 1 ms. In the case of P2 or P3, it could be any value, for example, 2 ms, 4 ms or 1 ms. For ease of understanding we will assume it is 1 ms in the present case.

Figure 1:
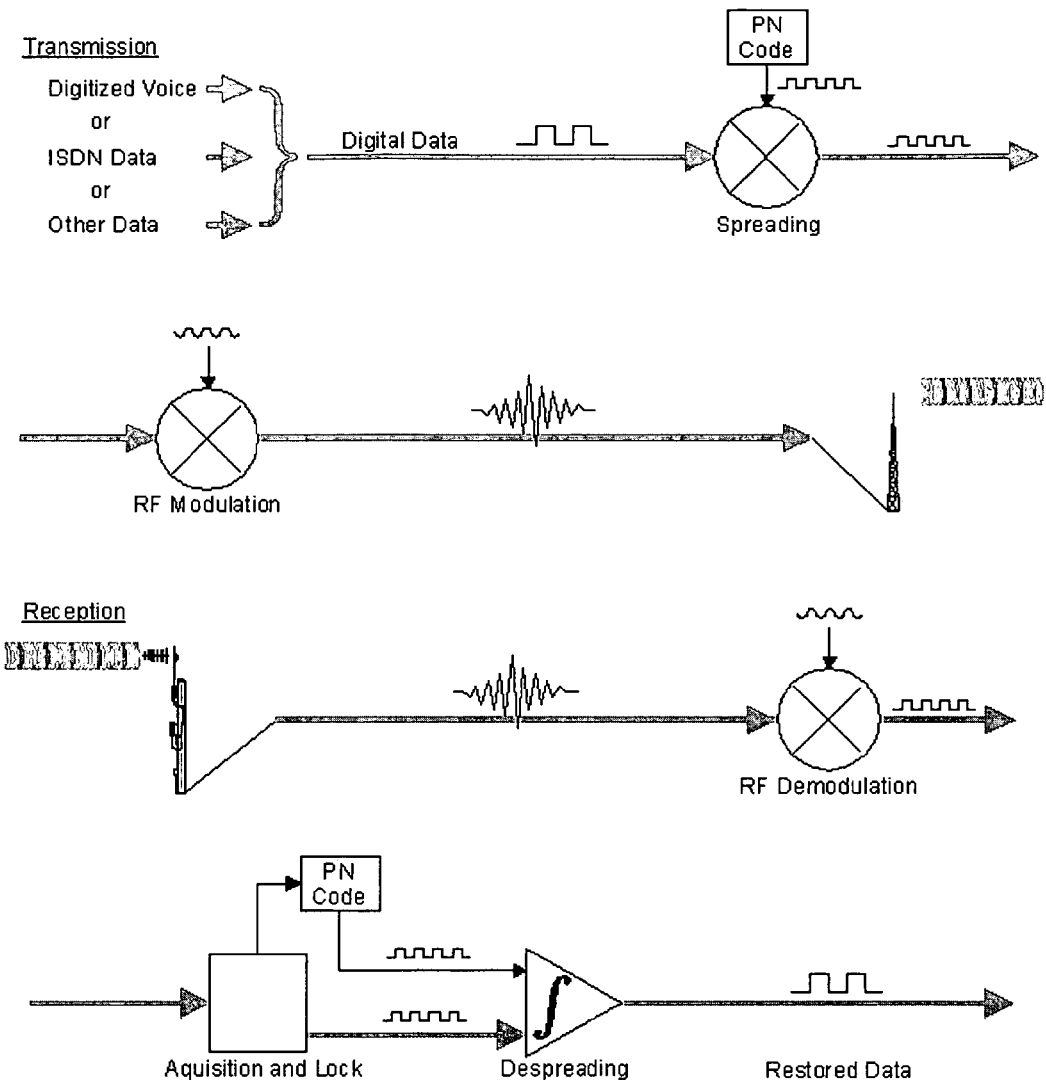
FIG. 1 is an illustration of a Direct Sequence Spread Spectrum System, according to the prior art but applicable to the present invention.
Figure 2:
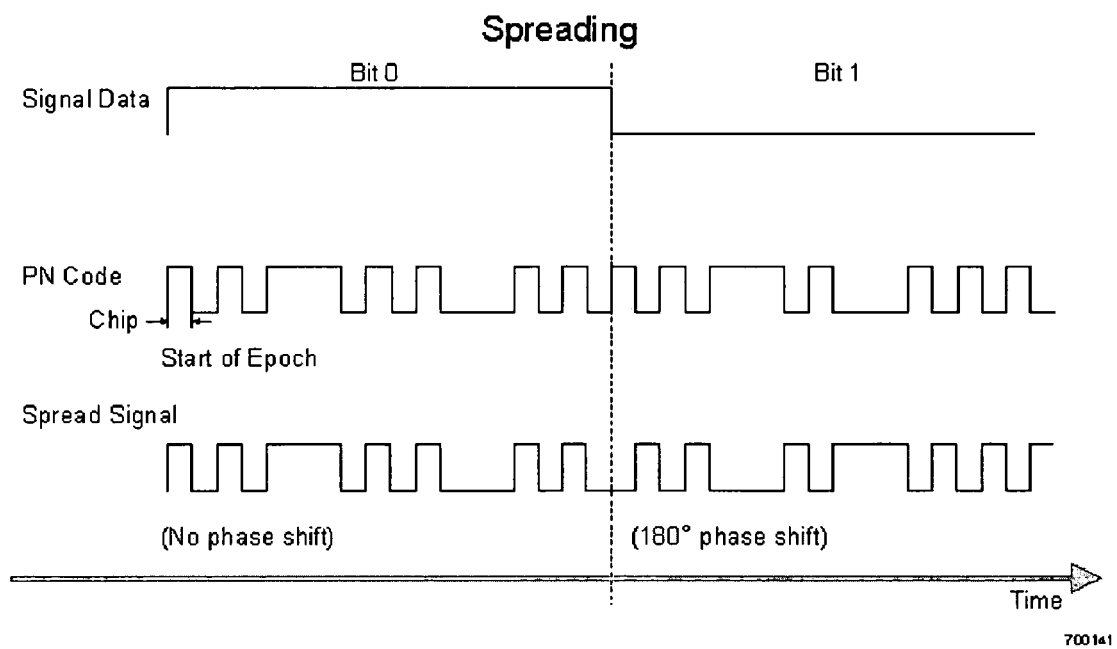
FIG. 2 illustrates Pseudorandom Noise Spreading, according to the prior art, but applicable to the present invention.
Figure 3:
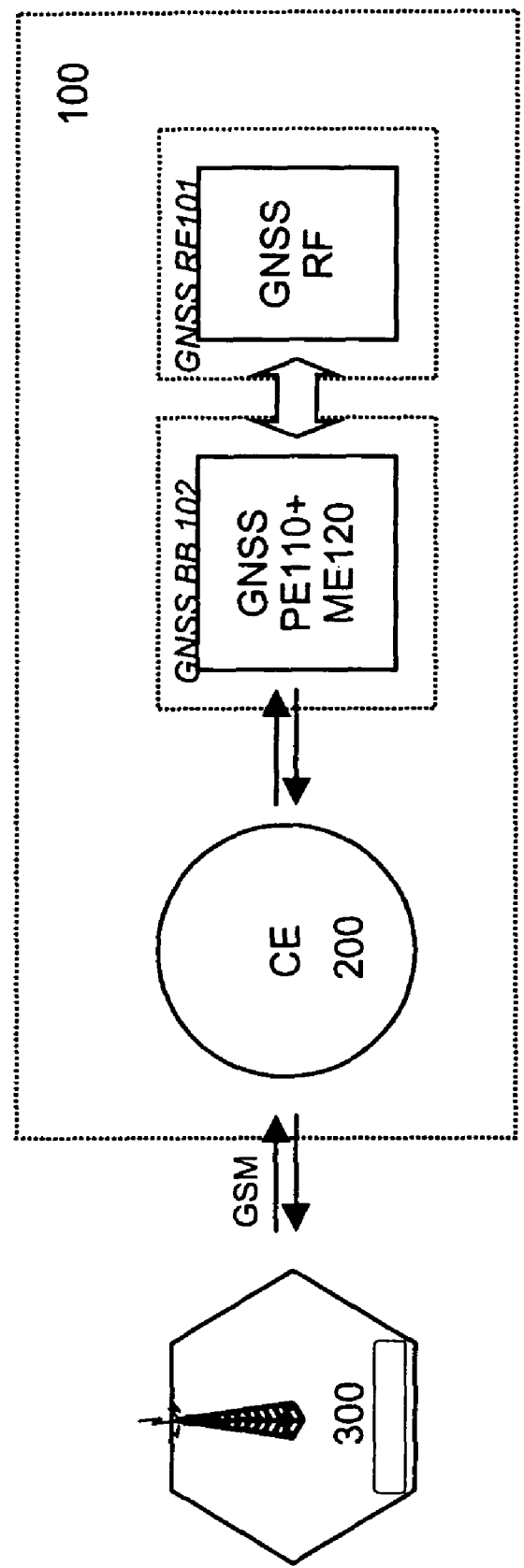
FIG. 3 is a schematic illustration of network assistance in a specific embodiment of the present invention.
Figure 4:
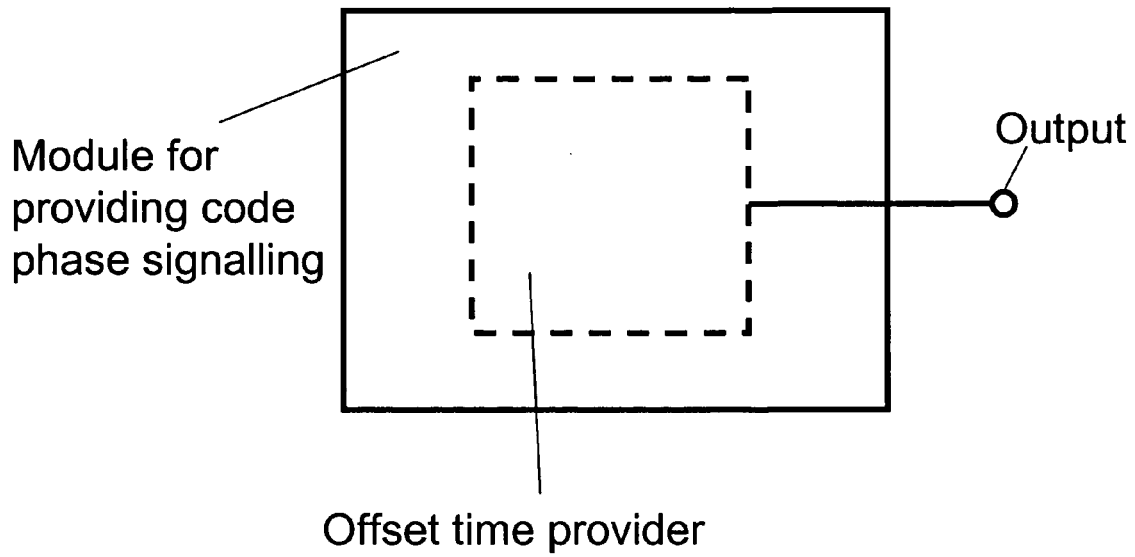
FIG. 4 is a diagram illustrating a module for providing code phase signaling.
Figure 5:
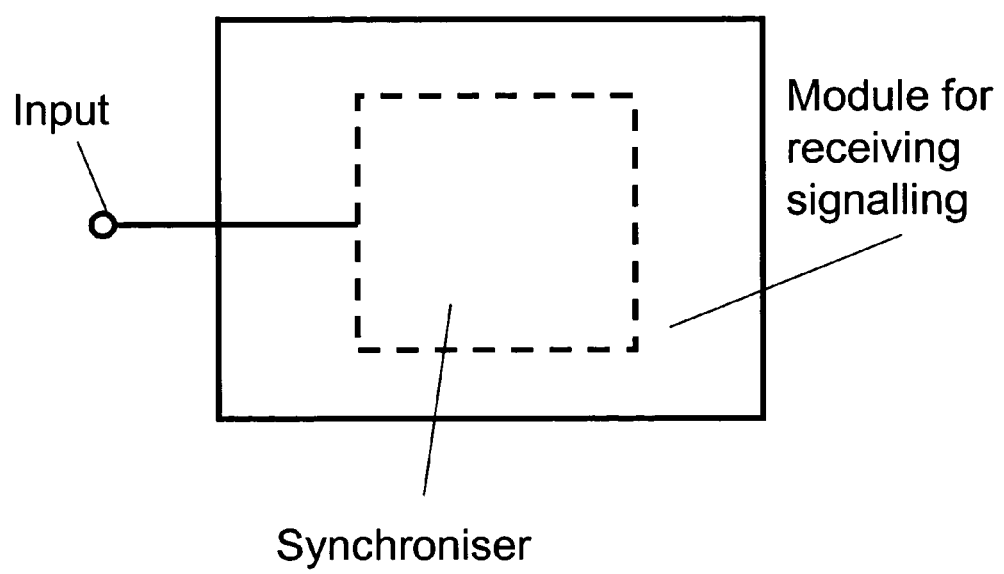
FIG. 5 is a diagram illustrating a module for receiving signaling.

A receiver 100, on the Earth, comprises a cellular (GSM) engine 200, GNSS RF module 101, a GNSS Measurement Engine (ME) module 120 and a GNSS Positioning Engine (PE) module 110. The GNSS RF module 101 is for reception of CDMA GNSS signalling from satellite navigation transmitters 1, 2, 3, 4 . . . etc. These signals are provided to the ME 120. The PE 110 and ME 120 may be housed in the same Baseband BB box (as shown in FIG. 3) or in different boxes.

The ME 120 is arranged to perform measurements on GNSS signals and convert them into suitable format for position information calculation in the PE 110. The ME hardware (HW) comprises BB HW module and GNSS RF front-end HW module (typical GNSS receiver HW), memory for GNSS signal samples and a processor for processing the sampled and stored GNSS signals, or a combination of the above.

The ME 120 has necessary low-level software (SW) and logic for carrying out signal acquisition, tracking, validation and data reception. The ME 120 also has necessary low-level SW for controlling the GNSS HW according to the configuration parameters given from PE 110 (power-save, frequency calibration, time calibration, Automatic Gain Control tuning, measurement interval, etc). The ME 120 can measure signalling from GPS, Glonass, and Galileo satellites, or any combination of these or other GNSS systems not specifically mentioned here. The term "low-level" relates to any aspect that relates to the real-time acquisition and tracking of satellite signals by the measurement component.

The PE 110 carries out position information calculation (position, velocity, time). The PE 110 produces low-level information for ME 120 to acquire GPS, Glonass and/or Galileo signals, that is, expected signal code phases, expected Doppler frequency, code and Doppler uncertainties, details of reference frequency, details of reference time. The PE 110 produces low-level control for ME 120 to enable power-save, power-off and power-on, self-testing etc. The PE 110 converts the GNSS assistance information from cellular networks or from other sources (WLAN, memory) into suitable format for the ME 120. In other words, PE removes the dependencies (e.g.to cellular network specific things like time transfer) to assistance data protocols and converts the assistance data into "GNSS format".

The PE 110 generates the necessary response messages according to the supported protocol. The PE 110 can use measurements other than GNSS measurements in position information calculation.

The receiver 100 receives the satellite CDMA signalling over the air interface. It also receives cellular network assistance from a cellular network 300 via e.g. GSM signalling over the air interface. The receiver 100 has two antennae and associated HW/SW 101, 200, one to receive CDMA signalling via the GNSS RF 101 and one to receive the GSM signalling 200 (FIG. 3). However, one common antenna could also be used.

The receiver 100 first needs to acquire the signalling from satellites 1, 2, 3 and 4 in order to determine its position on the Earth. Acquisition assistance is provided by the network 300.

The receiver 100 knows that satellites 1-4 should be visible. This information is provided in the receiver memory (not shown), e.g. from the last time the receiver 100 was turned on. Also provided in the memory are the pseudorandom codes (e.g. P1-P4) that are used by respective satellites to modulate their transmissions. These codes are used as synchronisation codes against the received signalling. A high correlation between a synchronisation code and the received signalling indicates that the phases of the codes have been matched.

Figure 6:
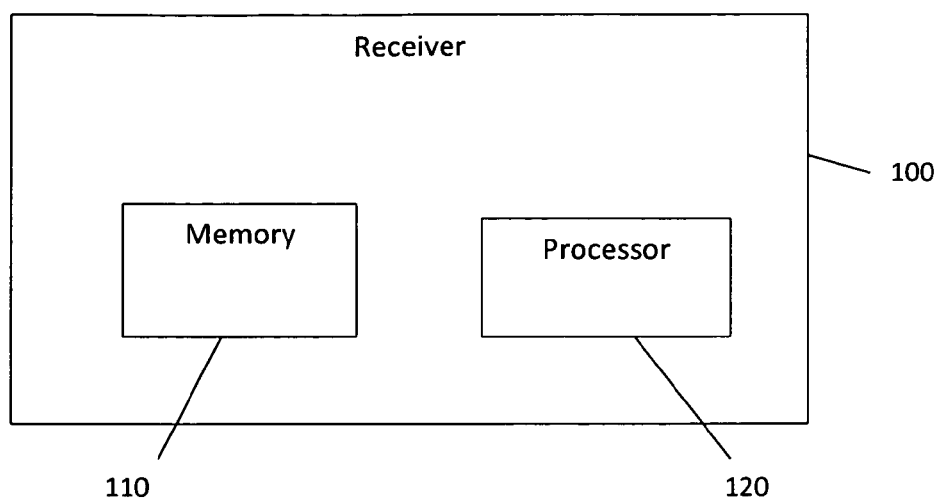
FIG. 6 is a diagram illustrating components of the receiver shown in FIG. 3.

The receiver 100 identifies code P1 from memory 110 (see FIG. 6) in order to begin the phase synchronisation process with satellite 1. The starting position within the code sequence P1 is determined from acquisition data provided by the cellular network 300.

The present invention can be used in two different interfaces; between the network 300 and receiver 100, and inside the receiver 100 between PE 120 and ME 110. So, let's consider the former interface first.

A device inside the network 300 measures the GNSS signals to provide code phase information. (In other embodiments, the device doesn't necessarily have to measure the signals but can virtually calculate them using commonly known techniques.) These GNSS signals (e.g. GPS and/or Galileo) are basically code phase values (and uncertainties), which are then transformed to seconds by basically dividing the code phase value with code length value of the particular system. So, in the case the code phase length value is 1023 chips/ms (P1), the code phase is represented by dividing the code phase value by 1023 chips/ms. In the case when the code length is 4095 chips/ms (P2), the code phase is represented by dividing the code phase value by 4095 chips/ms.

This code phase value can be considered to be a value in seconds, and represents the current phase with reference to a reference time, the reference time designating a particular specific position in the code sequence, for example, the beginning/middle/end of the code sequence. In the case that the reference time represents the beginning of the code sequence, the code phase value in seconds could represent the time elapsed from the reference time, the reference time corresponding to the commencement of signalling from the GNSS transmitters (i.e. offset from Monday 12 am GMT). However, the code phase value could represent the time elapsed from the beginning of a particular code sequence which is offset from the commencement of signalling e.g. the time offset from the beginning of the $3000^{th}$ repetition of the code sequence. In the latter case, fewer bits would be required to represent the value in seconds as the time offset would be comparatively small to the previously mentioned example.

The reference time would have to be known by the receiver 100. This could be provided and updated via the network or the GNSS.

This value in seconds, and the signal system identity information (a short constant value that tells whether the signal is GPS, Galileo, or something else) is then transmitted over some carrier to the receiver 100. The receiver 100 then uses this information in conjunction with the reference time in the acquisition of satellite signalling.

Consider the example when the reference time is based on Monday 12 am GMT so that the code phase values represent the offset time from Monday 12 am GMT. Consider that the current position of the code is 500 chips from Monday 12 am GMT for code sequence P1 and 700 chips from Monday 12 am GMT for code sequence P2. The code phase provided by the network to the receiver 100 is 500/1023 milliseconds for code sequence P1 and 700/4095 milliseconds for code sequence P2.

In the case of P1, the receiver 100 receives the code phase 500/1023 milliseconds. From the system identity information, the receiver knows that this code phase is for GPS signalling. Given that the receiver 100 knows the position of the code which corresponds to the reference time, and now it knows that the code phase is 500/1023, it can determine a good approximate to code phase which should be used to begin the correlation process for P1.

The same is for P2. The receiver 100 receives the code phase 700/4095 milliseconds. From the system identity information, the receiver knows that this code phase is for Galileo signalling. Given that the receiver 100 knows the position of the code which corresponds to the reference time, and now it knows that the code phase is 700/4095, it can determine a good approximate to code phase which should be used to begin the correlation process for P2.

Of course, there is also a need to transmit the "base time" when that acquisition assistance was valid. Outside this base time, new acquisition assistance data would be required.

The second interface works exactly the same way, but in that case the PE 110 calculates this "value in seconds" either from the acquisition assistance received from the network or from satellite orbit information. This "value in seconds", signal system identity information, uncertainty values (in seconds), and base time is then transmitted over some carrier (this can be for instance serial port) to the ME 120, which is basically a DSP processor 120 (see FIG. 6) that controls the actual hardware and then utilizes this information in search of the satellites.

Reference time for this case is also necessary to send with the "value in seconds". In this case, the reference time can be for instance in some form of local time between the PE 110 and the ME 120. A local time can be for instance some counter value from the baseband or it could be any common reference time.

Generally speaking, the receiver 100 is continuously receiving signalling from the satellites. The code phase may be used to synchronise with a past, present or future received portion of the code sequence received from satellites 1, 2, 3, 4 etc. The receiver 100 is arranged to be provided with the appropriate knowledge (over one of the air interfaces or pre-stored) to determine whether synchronisation should be conducted with a past, current or future received portion of the code sequence.

When the receiver is searching for the first satellite, it has to add its own uncertainties (reference time uncertainty, reference frequency uncertainty, etc) to the uncertainties given in the acquisition assistance. Once a first satellite is acquired, e.g. 1, the second satellite, e.g. 2, can be searched with smaller uncertainty, because now the receiver is able to reduce its own uncertainties based on the acquired signal.

Aspects of Doppler shift adjustment conducted in signal acquisition are not specifically discussed but may be conducted. Furthermore, although the GSM network is specifically mentioned for providing network assistance, network assistance may be provided via a Wireless Local Area Network (WLAN) transmission system, or any other suitable transmission system.

The invention claimed is:

1. A module for providing code phase time signalling, the module for providing code phase time signalling comprising at least one processor and at least one memory comprising computer code, the at least one memory and the computer program code configured to, with the at least one processor, cause the module for providing code phase time signalling to:
provide, to an output, code phase time signalling representing an offset time of a synchronisation code from a reference time, wherein:
the code phase time signalling is configured to be used by a module for receiving signalling to synchronise the phase of a synchronisation code provided from within the module for receiving signalling with the phase of a modulation code of direct sequence spread spectrum signalling received by the module for receiving signalling, a sequence of the synchronisation code corresponding to a sequence of the modulation code;
the reference time is associated with the time of transmission of a particular reference portion of a modulation code of the direct sequence spread spectrum signalling; and
the offset time is associated with the time of transmission of a subsequently transmitted offset portion of the modulation code of the direct sequence spread spectrum signalling.

2. A module for providing code phase time signalling according to claim 1, wherein the module for providing code phase time signalling is a module for providing multi code length code phase time signalling configured to provide code phase time signalling in one or more multi code length direct sequence spread spectrum systems.

3. A module for providing code phase time signalling according to claim 1, wherein the offset time is used to synchronise with a past, present, or future received portion of the modulation code sequence of the direct sequence spread spectrum signalling, the direct sequence spread spectrum signalling being received from a module for transmitting signalling.

4. A module for providing code phase time signalling according to claim 1, wherein the modulation code sequence has a length comprising a predetermined number of chips, and wherein the module for providing code phase time signalling is configured to represent the offset time of the modulation code by dividing the number of chips from the offset position to the reference position by the predetermined number of chips corresponding to the sequence length.

5. A module for providing code phase time signalling according to claim 1, wherein the modulation code sequence has a length comprising a predetermined number of chips transmitted at a particular transmission rate, and wherein the module for providing code phase time signalling is configured to represent the offset time of the modulation code by dividing the number of chips from the offset position to the reference position by the transmission rate of the predetermined number of chips corresponding to the sequence length.

6. A module for providing code phase time signalling according to claim 1, wherein the direct sequence spread spectrum signalling is received from a module for transmitting signalling, the module transmitting signalling being inside the same device as the module for receiving signalling.

7. A module for providing code phase time signalling according to claim 6, wherein the module for transmitting signalling is a PE (Positioning Engine) and the module for receiving signalling is a ME (Measurement Engine).

8. A module for providing code phase time signalling according to claim 1, wherein the modulation code is configured to cyclically repeat.

9. A module for providing code phase time signalling according to claim 1, wherein the reference time represents the beginning of a cyclically repeating modulation code.

10. A module for providing code phase time signalling according to claim 1, wherein the reference portion is the beginning, middle or end of the modulation code.

11. A module for providing code phase time signalling according to claim 1, wherein the synchronisation code sequence is a pseudorandom code sequence.

12. A module for providing code phase time signalling according to claim 1, wherein the synchronisation code sequence is provided from within the module for receiving signalling by a shift register or a memory.

13. A module for providing code phase time signalling according to claim 1, wherein the direct sequence spread spectrum signalling is code division multiple access signalling.

14. A module for providing code phase time signalling according to claim 1, wherein the module for providing code phase time signalling is comprised in a cellular network device.

15. A module for providing code phase time signalling according to claim 1, wherein the module for providing code phase time signalling is comprised in a receiver comprising the module for receiving signalling.

16. A module for providing code phase time signalling according to claim 1, wherein the module for providing code phase time signalling is comprised in a receiver comprising the module for receiving signalling, and wherein the receiver is a cellular telecommunications device.

17. A module for providing code phase time signalling according to claim 1, wherein the module for receiving signalling is comprised in a global navigation satellite receiver.

18. A module for providing code phase time signalling according to claim 1, wherein the module for receiving signalling is a receiver module remote of the module for providing code phase time signalling.

19. A module for providing code phase time signalling according to claim 1, wherein the direct sequence spread spectrum signalling is received from a module for transmitting signalling, wherein the module for transmitting signalling is a transmitter module remote of the module for providing code phase time signalling.

20. A cellular network device comprising a module for providing code phase time signalling according to claim 1.

21. A module for providing code phase time signalling according to claim 1, wherein the module is configured to transmit the code phase time signalling via a cellular air interface to a receiver module comprised in a cellular telecommunications device.

22. A module for receiving signalling, comprising at least one processor and at least one memory comprising computer code, the at least one memory and the computer program code configured to, with the at least one processor, cause the module for receiving signalling to:
  receive code phase time signalling by an input, the code phase time signalling representing an offset time of a synchronisation code from a reference time, wherein;
    the reference time is associated with the time of transmission of a particular reference portion of a modulation code of received direct sequence spread spectrum signalling, and
    the offset time is associated with the time of transmission of a subsequently transmitted portion of the modulation code of the direct sequence spread spectrum signalling, and wherein a sequence of the synchronisation code corresponds to a sequence of the modulation code; and
  use the code phase time signalling to synchronise the phase of a synchronisation code provided from within the module for receiving signalling with the phase of the modulation code of the direct sequence spread spectrum signalling received by the module for receiving signalling, to assist in signal acquisition of direct sequence spread spectrum signalling received by the module for receiving signalling.

23. A global navigation system comprising a module for providing code phase time signalling according to claim 1, and further comprising a module for receiving signalling comprising at least one processor and at least one memory comprising computer code, the at least one memory and the computer program code configured to, with the at least one processor, cause the module for receiving signalling to:
  receive code phase time signalling by an input, the code phase time signalling representing an offset time of a synchronisation code from a reference time, wherein:
    the reference time is associated with the time of transmission of a particular reference portion of a modulation code of received direct sequence spread spectrum signalling, and
    the offset time is associated with the time of transmission of a subsequently transmitted portion of the modulation code of the direct sequence spread spectrum signalling, and wherein a sequence of the synchronisation code corresponds to a sequence of the modulation code; and use the code phase time signalling to synchronise the phase of a synchronisation code provided from within the module for receiving signalling with the phase of the modulation code of the direct sequence spread spectrum signalling received by the module for receiving signalling, to assist in signal acquisition of direct sequence spread spectrum signalling received by the module for receiving signalling.

24. A global navigation satellite system comprising a module for providing code phase time signalling according to claim 1.

25. A global navigation satellite system comprising a module according to claim 22.

26. A method of providing code phase time signalling, using at least one processor and at least one memory comprising computer code, the at least one memory and the computer program code configured to, with the at least one processor, perform:
providing code phase time signalling representing an offset time of a synchronisation code from a reference time wherein:
the code phase time signalling is configured to be used by a module for receiving signalling to synchronise the phase of a synchronisation code provided from within the module for receiving signalling with the phase of a modulation code of direct sequence spread spectrum signalling received by the module for receiving signalling, a sequence of the synchronisation code corresponding to a sequence of the modulation code;
the reference time is associated with the of transmission of a particular reference portion of a modulation code of the direct sequence spread spectrum signalling; and
the offset time is associated with the time of transmission of a subsequently transmitted offset portion of the modulation code of the direct sequence spread spectrum signalling.

27. A non-transitory computer-readable medium, encoded with instructions that, when executed by a computer, perform the method of claim 26.

28. A method of receiving code phase time signalling, using at least one processor and at least one memory comprising computer code, the at least one memory and the computer program code configured to, with the at least one processor, perform:
receiving code phase time signalling, the code phase time signalling representing an offset time of a synchronisation code from a reference time, wherein:
the reference time is associated with the time of transmission of a particular reference portion of a modulation code of received direct sequence spread spectrum signalling, and
the offset time is associated with the time of transmission of a subsequently transmitted portion of the modulation code of the direct sequence spread spectrum signalling, and wherein a sequence of the synchronisation code corresponds to a sequence of the modulation code; and
use the code phase time signalling to synchronize the phase of a synchronisation code provided from within a module for receiving signalling with the phase of the modulation code of the direct sequence spread spectrum signalling received by the module for receiving signalling, to assist in signal acquisition of direct sequence spread spectrum signalling received by the module for receiving signalling.

29. A non-transitory computer-readable medium, encoded with instructions that, when executed by a computer, perform the method of claim 28.

30. An apparatus for providing code phase time signalling comprising at least one processor and at least one memory comprising computer code, the at least one memory and the computer program code configured to, with the at least one processor, cause the apparatus to:
provide code phase time signalling representing an offset time of a synchronisation code from a reference time, wherein:
the code phase time signalling is configured to be used by an apparatus for receiving signalling to synchronise the phase of a synchronisation code provided from within the apparatus for receiving signalling with the phase of a modulation code of direct sequence spread spectrum signalling received by the apparatus for receiving signalling, a sequence of the synchronisation code corresponding to a sequence of the modulation code;
the reference time is associated with the time of transmission of a particular reference portion of a modulation code of the direct sequence spread spectrum signalling; and
the offset time is associated with the time of transmission of a subsequently transmitted offset portion of the modulation code of the direct sequence spread spectrum signalling.

31. An apparatus for receiving signalling, comprising at least one processor and at least one memory comprising computer code, the at least one memory and the computer program code configured to, with the at least one processor, cause the apparatus for receiving signalling to:
receive code phase time signalling, the code phase time signalling representing an offset time of a synchronisation code from a reference time, wherein:
the reference time is associated with the time of transmission of a particular reference portion of a modulation code of received direct sequence spread spectrum signalling, and
the offset time is associated with the time of transmission of a subsequently transmitted portion of the modulation code of the direct sequence spread spectrum signalling, and wherein a sequence of the synchronisation code corresponds to a sequence of the modulation code; and
use the code phase time signalling to synchronise the phase of a synchronisation code provided from within the apparatus for receiving signalling with the phase of the modulation code of the direct sequence spread spectrum signalling received by the apparatus for receiving signalling to assist in signal acquisition of direct sequence spread spectrum signalling received by the apparatus for receiving signalling.

32. A code phase time signalling provider comprising at least one processor and at least one memory comprising computer code, the at least one memory and the computer program code configured to, with the at least one processor, cause the code phase time signalling provider to:
provide, to an output, code phase time signalling representing an offset time of a synchronisation code from a reference time, wherein:
the code phase time signalling is configured to be used by a signalling receiver to synchronise the phase of a synchronisation code provided from within the signalling receiver with the phase of a modulation code of the direct sequence spread spectrum signalling received by the signalling receiver, a sequence of the synchronisation code corresponding to a sequence of the modulation code;

the reference time is associated with the time of transmission of a particular reference portion of a modulation code of the direct sequence spread spectrum signalling; and the offset time is associated with the time of transmission of a subsequently transmitted offset portion of the modulation code of the direct sequence spread spectrum signalling.

33. A signalling receiver comprising at least one processor and at least one memory comprising computer code, the at least one memory and the computer program code configured to, with the at least one processor, cause the signalling receiver to:

receive code phase time signalling representing an offset time of a synchronisation code from a reference time, wherein:

the reference time is associated with the time of transmission of a particular reference portion of a modulation code of received direct sequence spread spectrum signalling, and the offset time is associated with the time of transmission of a subsequently transmitted portion of the modulation code of the direct sequence spread spectrum signalling, and wherein a sequence of the synchronisation code corresponds to a sequence of the modulation code; and use the code phase time signalling to synchronise the phase of a synchronisation code provided from within the signalling receiver with the phase of the modulation code of the direct sequence spread spectrum signalling received by the signalling receiver, to assist in signal acquisition of direct sequence spread spectrum signalling received by the signalling receiver.

* * * * *